April 2, 1963  K. W. WOODSON  3,083,821
PACKAGE SEALING
Filed May 15, 1961
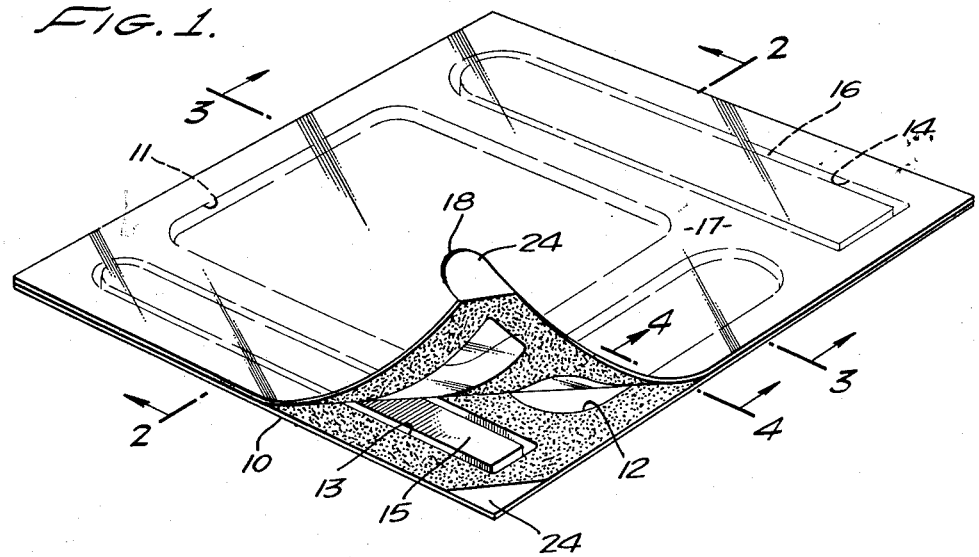
FIG. 1.
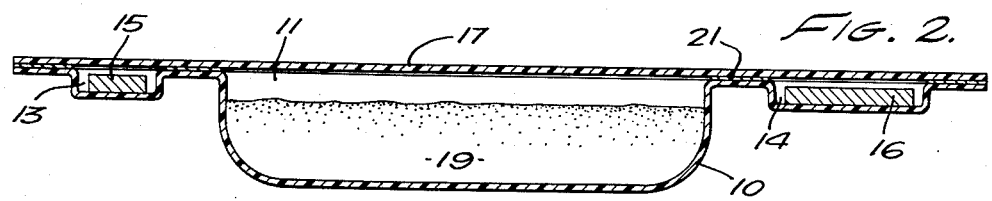
FIG. 2.
FIG. 3.
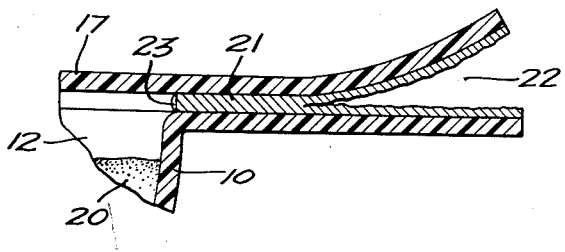
FIG. 4.
KENNETH W. WOODSON
INVENTOR.
BY Hazard & Miller
ATTORNEYS

United States Patent Office 3,083,821
Patented Apr. 2, 1963

3,083,821
PACKAGE SEALING
Kenneth W. Woodson, 251 Ocean View St.,
Newport Beach, Calif.
Filed May 15, 1961, Ser. No. 110,196
4 Claims. (Cl. 206—47)

This invention relates to packages and to a method of producing the same.

Heretofore, various commodities have been packaged by placing the commodity in a formed or pocketed body or container of polyethylene, polyvinyl chloride, cellulose acetate or other types of thermoplastic, or thermosetting material, and confining the commodity in the pocket or pockets by placing thereover a flexible thermoplastic cover. The cover has heretofore been retained in position to enclose the commodity in the body or container by a pressure sensitive adhesive which retains the edges of the cover in applied position on the container until the time of use. At the time of use the cover can be peeled back from the edges of the body or container, the pressure sensitive adhesive enabling the cover to be readily separated from the container.

It has been proposed to produce packages containing a small supply of epoxy resin and a catalyst therefor which are kept separated until the time of use. At the time of use the resin and catalyst can be combined so that the catalyst will cause the epoxy resin to commence to set or harden. Because of the fact that the catalyst when mixed with the resin will cause it to commence to set or harden it is of the utmost importance to keep these separate from each other in the package until the time of use.

The thermoplastic packages above mentioned wherein the cover is attached to the body or container by means of a pressure sensitive adhesive are unsuitable for packaging epoxy resins and catalysts therefor due to the fact that the catalyst for the epoxy resin which is usually an amine, will penetrate or pass through the pressure sensitive adhesive that attaches the cover to the container between the pockets or compartments designed to keep the epoxy resin and catalyst separate from each other.

A primary object of the present invention is to provide a novel package containing two substances which must be kept separated until the time of use, and to provide a novel means and method of sealing the package in such a manner that the substances will not mix prior to the time of use. At the same time the package is readily openable at the time of use to permit of the mixture of one substance, such as the catalyst with the other, such as the epoxy resin.

With the foregoing and other objects in view, which will be made manifest in the following detailed description and specifically pointed out in the appended claims, reference is had to the accompanying drawings for an illustrative embodiment of the invention, wherein:

FIGURE 1 is a perspective view of one form of package embodying the present invention, the package being shown in the process of being opened;

FIG. 2 is an enlarged vertical section taken substantially upon the line 2—2 upon FIG. 1 in the direction indicated;

FIG. 3 is a vertical section taken substantially upon the line 3—3 upon FIG. 1 in the direction indicated; and FIG. 4 is an enlarged fragmentary section taken substantially upon the line 4—4 upon FIG. 1 in the direction indicated.

Referring to the accompanying drawings wherein similar reference characters designate similar parts throughout, 10 indicates a body or container layer of a heat-sealable plastic such as for example polyvinyl chloride. This lower or container layer is usually formed and is preferably fairly stiff. It is formed to provide one or more pockets designed to contain various commodities. Thus, for the purpose of marketing a supply of epoxy resin and the catalyst therefor the body 10 is preferably provided with two pockets such as those indicated at 11 designed to contain a supply of epoxy resin and a pocket 12 designed to contain a catalyst for the epoxy resin which usually is an amine. I have illustrated the pocket 11 as being relatively large and the pocket 12 which contains the catalyst as being relatively small. This is due to the fact that in the usual situation the volume of catalyst is small as compared with the volume of resin. This relationship is not necessarily true in all instances as there are situations where the volume of catalyst may be as great as, or even exceed, the volume of resin in which case the pockets may be of the same size or otherwise altered to fit various requirements.

Additional pockets, such as those indicated at 13 and 14, may also be formed in the lower or container layer 10 designed to contain a narrow spatula or the like indicated at 15 and a wider spatula or applicator indicated at 16. Other or additional pockets may be present to contain other desirable implements. The presence or absence of these additional pockets and spatulas or other instruments is of course optional.

A cover 17 is provided which is formed of preferably transparent polyvinyl chloride plastic. This cover preferably completely overlies the body layer 10 except for the presence of a projecting tab 18 which projects beyond the margin of the body 10 to facilitate its being grasped in the course of opening the package. This cover layer 17 is attached to the body or container layer 10 to confine the commodities, such as the epoxy resin 19 and its catalyst 20, in their respective pockets.

As above explained, the use of a pressure sensitive adhesive to attach the cover to the body 10 is unsatisfactory to confine commodities that should be kept separated from each other due to the fact that the catalyst 20 which is usually an amine, will penetrate and pass through the pressure sensitive adhesive where the pressure sensitive adhesive attaches the cover to the container at the portions located between the pockets 11 and 12. This penetration of the catalyst through the pressure sensitive adhesive will enable the catalyst to cause the resin to set prior to the time of use.

In accordance with the present invention a layer of paper 21 is interposed between the body layer 10 and the cover layer 17. This layer of paper is preferably coated on both sides with a heat-sealable plastic such as polyvinyl chloride. The layer of paper has apertures formed therein which register with the tops of the pockets 11, 12, 13, and 14. The two opposed layers of polyvinyl chloride plastic 10 and 17 are heat-sealed to the opposite sides of the layer of paper 21 instead of being heat-sealed directly to each other as in some forms of packaging. With the two layers of polyvinyl chloride plastic heat-sealed to opposite sides of the paper around and between the pockets the commodities in the pockets will be confined in their respective pockets and there is no danger of the catalyst 20 becoming prematurely mixed with the epoxy resin 19.

At the time of use the tab 18 of the cover is grasped and pulled from the body layer 10 which causes the layers of paper to split or tear as indicated at 22 on FIG. layer of.-rfiauw-
4. The heat-sealing between the polyvinyl chloride plastic layers and the paper is such that the plastic will not separate from the paper but the paper will tear or split between its top and bottom surfaces as indicated. When the package has been thus opened deliberately the catalyst 20 can be mixed with the resin 19 in the usual manner and applied by means of either or both of the spatulas 15 and 16.

In order to assure that the catalyst and resin will not mix with each other through the paper that is heat-sealed between the opposed layers of plastic 10 and 17, the edges of the paper surrounding the pockets 11 and 12 may be coated with a coating indicated at 23, see FIG. 4, that is inert thereto such as for example a coating of polyvinyl chloride or the like. This prevents the resin or the catalyst from soaking through the paper and bringing about a premature mixture.

In lieu of the paper layer there may be employed other readily separable or tearable materials which are inert to the commodities that are contained in the pockets, such as for example an extremely flexible and consequently weaker layer of polyvinyl chloride can be used in lieu of the paper. The two layers 10 and 17 can be heat-sealed directly to the opposite sides thereof and at the time of use due to the weakness of the central flexible layer of polyvinyl chloride it will tear intermediate its top and bottom to enable the layers 17 and 10 to be separated.

It is possible to eliminate heat-sealing of the cover 17 and the container 10 to the opposite sides of a paper layer or a polyvinyl chloride layer by using an adhesive that is inert to or will not be attacked by the contents of the package. For example, in lieu of using an intervening layer of paper or polyvinyl chloride, and adhesive may be used formed of the epoxy resin and a catalyst which may be the same epoxy resin and catalyst contained in the container. When these are used as an adhesive they fasten the cover directly to the container or may be used to fasten the cover and container to opposite sides of the paper. The resin having been subjected to the action of the catalyst and having set or hardened will be thereafter inert to the presence of the resin and catalyst confined in the pockets. Under these circumstances, the resin and catalyst selected should be such that the layer of adhesive formed thereby is more readily separable or tearable in the manner indicated at 22 on FIG. 4, than the materials from which the cover 17 and container 10 are formed.

In lieu of the tab 18 a corner of the paper 21 may be removed as indicated at 24, so that there is a small space between the cover and container adjacent the corner into which a fingernail or instrument may be inserted to initiate the peeling of the cover from the container when it is desired to open the package. The removed corner can be employed also in conjunction with the tab 18 to facilitate the initial peeling.

It will be noted that the top surfaces of the lower layer 10 around and between the pockets 11, 12, 13, and 14 are all arranged in substantially the same plane. Consequently, the paper or splittable layer 21 may be formed of a substantially flat layer of material that is merely apertured with apertures which register with the tops of the pockets. Also, the upper layer 17 which is not only transparent but flexible, may be formed from a substantially flat layer of material. Due to the fact that the splittable layer 21 is formed of a layer of material of uniform thickness and occupies a position between opposed flat surfaces on the top and bottom of the lower and upper layers 10 and 17, respectively, it is relatively easy to heat-seal around and between the pockets in a leakproof manner to prevent ingress of the catalyst from its pocket into the resin in its pocket which would otherwise cause a premature setting of the resin.

From the above-described construction it will be appreciated that the improved package is such that substances such as the resin 19 and its catalyst 20 can be maintained in a separated condition until the time of use. At the time of use the cover can be readily peeled from the body or container by tearing or splitting the paper 21 which remains adhered partially to the body 10 and partially to the flexible cover 17. The cover and container can be heat-sealed to the opposite sides of the paper, or in lieu thereof other materials inert to the contents of the package and which are more readily tearable than the cover and container can be employed.

While the improved package has been primarily designed for marketing quantities of epoxy resin and the catalyst therefor, it will be appreciated that it may be employed for other commodities which must be kept separate from each other until the time of use, and either or both of which are capable of permeating through pressure sensitive adhesives.

Various changes may be made in the details of construction without departing from the spirit and scope of the invention as defined by the appended claims.

I claim:
1. A package comprising a lower layer of heat-sealable plastic shaped to provide at least two spaced pockets in the upper surface thereof, an epoxy resin in one pocket, a catalyst for the resin in the other pocket, the top surfaces of the lower layer around and between the pockets being arranged in substantially the same plane, an upper layer of flexible heat-sealable plastic disposed over said surfaces on the lower layer and covering said pockets, and a substantially flat layer of splittable material between said layers of heat-sealable plastic having apertures registering with the tops of the pockets, said upper and lower layers of heat-sealable plastic being heat-sealed to the bottom and top surfaces, respectively, of the layer of splittable material around and between said pockets.

2. A package as defined in claim 1 wherein the layers of heat-sealable plastic are detached from each other adjacent the marginal edge thereof to facilitate splitting the splittable layer in opening the package.

3. A package as defined in claim 1 wherein the splittable layer is formed of paper.

4. A package as defined in claim 1 wherein the splittable layer is formed of paper having the edges around the apertures therein coated with a coating inert to the materials in the pockets.

References Cited in the file of this patent
UNITED STATES PATENTS

| | | |
|---|---|---|
| 2,302,045 | Neumann | Nov. 17, 1942 |
| 2,756,875 | Yochim | July 31, 1956 |
| 2,816,666 | Nadel | Dec. 17, 1957 |
| 2,861,405 | Hanford | Nov. 25, 1958 |
| 2,892,538 | Middleton | June 30, 1959 |
| 2,898,744 | Robbins | Aug. 11, 1959 |
| 2,932,385 | Bollmeier | Apr. 12, 1960 |
| 2,950,004 | Acomb | Aug. 23, 1960 |
| 2,990,948 | Zackheim | July 4, 1961 |

FOREIGN PATENTS

| | | |
|---|---|---|
| 773,172 | Great Britain | Apr. 24, 1957 |
| 831,550 | Great Britain | Mar. 30, 1960 |